Sept. 10, 1968   J. HALLER   3,400,991
ROLLER BEARING ASSEMBLY
Filed March 30, 1966
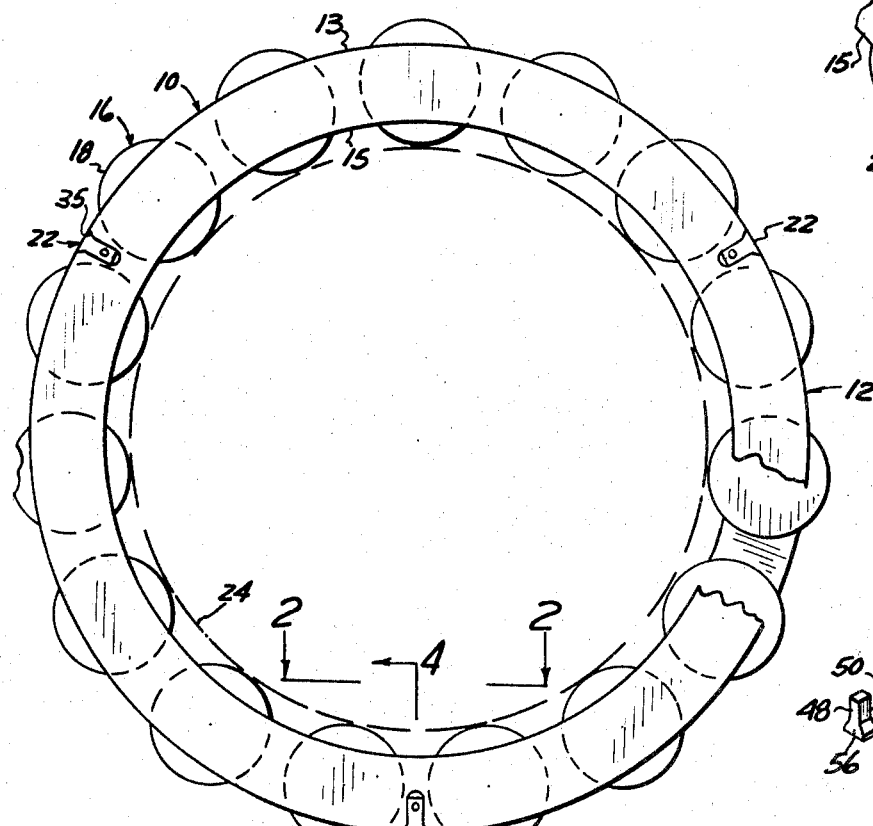
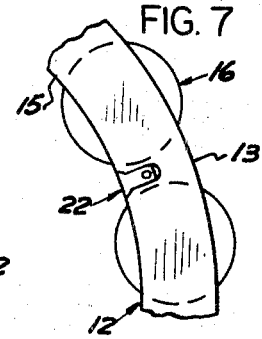
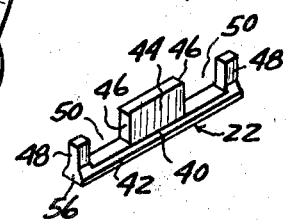
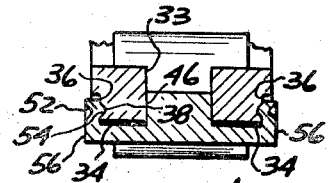
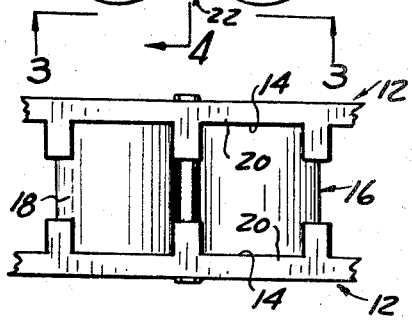
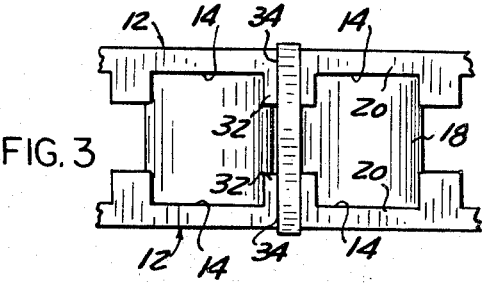
INVENTOR
JOHN HALLER
BY *Barthel & Bugbee*
ATTORNEYS United States Patent Office 3,400,991
Patented Sept. 10, 1968

3,400,991
ROLLER BEARING ASSEMBLY
John Haller, Northville, Mich., assignor to Federal-Mogul Corporation, Detroit, Mich., a corporation of Michigan
Filed Mar. 30, 1966, Ser. No. 538,762
8 Claims. (Cl. 308—217)

ABSTRACT OF THE DISCLOSURE

This roller bearing assembly includes a retainer cage having a pair of oppositely-facing annular roller retainers with roller-receiving end recesses therein formed by molding powdered material, such as powdered metal or powdered nylon plastic. Circumferentially-spaced aligned peripheral grooves in the retainers snugly receive spacing tie bars having radially-projecting outer ends which are seated in corresponding radial notches in the outer faces of the retainer rings, with their inner ends staked into indentations in said notches.

---

Hitherto, roller bearing retainer cages have consisted of two axially-spaced parallel annular retainers with their outer surfaces indented at circumferentially-spaced intervals so as to form similarly spaced pivotal projections on their inner or facing surfaces adapted to engage and retain the recessed ends of bearing rollers, the assembly being held together by circumferentially separated spacing rods having reduced diameter opposite ends passing through aligned holes in the retainers and having the exposed ends upset in a rivet-like manner to hold the assembly together. This construction requires expensive machining operations from costly steels with a large proportion of expensive scrap from the central discs and surrounding stampings punched out of sheet metal, as well as requiring expensive hand assembly operations. Furthermore, these prior spacing rods occupy so much space between the bearing rollers as to require spacing the rollers unevenly and reducing the number thereof with a consequent reduction in the load-bearing capacity of the assembly and at unequal load-bearing capacity for different circumferential parts of the bearing assembly.

The present invention has for its objects the elimination of these disadvantages by providing a roller bearing retainer cage in which opposing annular retainers with roller end recesses therein are formed by molding, and then sintering, powdered material such as powdered metal or powdered nylon plastic, fitting grooves in the retainers and having radially-projecting outer ends which are staked into corresponding depressions in the outer faces of the retainer rings. As a result of the present invention scrap losses are eliminated, a greater number of bearing rollers is accommodated around a given circumference, and a more uniform load-bearing capacity is consequently imparted throughout the entire circumference of the roller bearing assembly.

Other objects and advantages of the invention will become apparent during the course of the following description of the accompanying drawing, wherein:

FIGURE 1 is a side elevation of a roller bearing assembly utilizing the retainer cage of one form of the invention, with spacers mounted in the grooved outer peripheries of the retainers, and with one of the retainer rings broken away to disclose the construction behind it;

FIGURE 2 is a fragmentary top plan view of the roller bearing assembly of FIGURE 1, looking outward from the inside along the line 2—2 in FIGURE 1;

FIGURE 3 is a fragmentary bottom plan view of the roller bearing assembly of FIGURE 1, looking inward from the outside along the line 3—3 in FIGURE 1;

FIGURE 4 is a cross-section taken along the line 4—4 in FIGURE 1;

FIGURE 5 is a fragmentary perspective view of a short portion of one of the retainers of FIGURE 1, looking toward the inner face with its roller recesses;

FIGURE 6 is a perspective view of one of the spacers of the roller bearing assembly of FIGURE 1, prior to assembly and staking in position; and FIGURE 7 is a fragmentary side elevation similar to FIGURE 1, but with the spacers mounted in the grooved inner peripheries of the retainers.

Referring to the drawing in detail, FIGURE 1 shows a roller bearing assembly, generally designated 10, according to one form of the invention but with the conventional outer and inner races omitted in order to simplify the disclosure and enable parts otherwise concealed to be shown more clearly. The roller bearing assembly 10 includes a pair of annular bearing roller retainers 12 with outer and inner annular peripheries 13 and 15 disposed coaxial with one another in spaced parallel relationship. The retainers 12 are of similar but opposite construction in that they have corresponding portions facing one another in a right-hand and left-hand arrangement with facing recesses or sockets 14 receiving the bearing rollers 16, as explained below. The bearing rollers 16 are preferably of solid steel with cylindrical outer or peripheral surfaces 18 and flat plain opposite ends 20.

The retainers 12 are held in spaced parallel coaxial relationship by spacers or spacer tie bars 22 (FIGURE 6) mounted at circumferentially-spaced intervals around the retainers 12, three such spacers 22 being shown but a greater number being preferably employed for heavy duty bearings. The roller bearing assembly 10 of FIGURE 1 shows the spacers 22 mounted on the outer peripheries of the annular roller retainers 12 where the cylindrical surfaces 18 of the rollers 16 roll upon the bottom cylindrical surface 24 of an annularly-grooved inner race (not shown), the surface 24 being indicated by a dotted circle in FIGURE 1. If, on the other hand, the rollers 16 are intended to roll upon a roller path surface 25 in an annularly-grooved outer race (FIGURE 7), the spacers 22 are mounted between rollers in the grooved inner peripheries 15 of the retainers 12 and extend radially outward in the reverse of that shown in FIGURE 1 where the spacers 22 are placed at the outer edges of the retainers 12 and extend radially inward. In FIGURE 7, similar or corresponding parts are designated with the same reference numerals as in FIGURES 1 to 6.

Each retainer 12 (FIGURE 5) has an annular wall 26 containing the circumferentially-spaced recesses 14, which are of interrupted cylindrical shape with flat bottom surfaces 28 and partial cylindrical opposite side wall surfaces 30 formed on the opposite sides of partition walls 32 of capstan-shaped cross-section with abutment surfaces 33 on their inner ends. Certain of the partition walls 32 and the adjacent side wall 26 are grooved axially at 34 with converging side surfaces 35 (FIGURE 1) and on their outer surfaces are notched radially at 36 with indentations 38 formed in the bottoms of the radial outer recesses 36. The spacers 22 are adapted to be mounted in the axial grooves 34 and radial notches 36 during assembly of the roller bearing assembly 10, in a manner described below in connection with the operation of the invention in a step involving deformation of the spacers 22.

Each spacer 22 is in the form of a short thin bar also preferably of powdered material, such as sintered powdered metal having an elongated truncated prismatic outer portion 40 (FIGURE 6) with tapered or inwardly-converging side surfaces 42 proportioned and arranged to fit snugly into the tapered grooves 34 so as to mate therewith. Each spacer 22 has a central rectangular spacing intermediate abutment portion 44 extending radially inward from the elongated portion 42 and having parallel radial faces of shoulders 46 which, in assembly, engage the abutment surfaces 33 of the partition walls 32 (FIGURE 4) and maintain the bearing roller retainers 12 in accurately-separated spaced parallel relationship. Extending radially inward from the opposite ends of the elongated portion 42 of each space 22 is an end portion consisting of a small rectangular projection or lug 48 which is so dimensioned as to fit snugly into the short radial grooves or recesses 36. The projections 48 are spaced apart from the central spacing portion 44 of each spacer 22 at such distances as to provide rectangular notches 50 (FIGURE 6) with which the annular bearing roller retainers 12 interfit.

In the assembly of the component parts 12, 16 and 22 of the bearing assembly 10, a set of bearing rollers 16 of carefully selected lengths and diameters is mounted in the recesses or sockets 14. This is most conveniently done when the retainer 12 is placed in a horizontal position on a suitable support with its bearing roller recesses or sockets 14 facing upward. The companion retainer 12 is then placed above and aligned with the roller-filled retainer 12 and lowered into engagement with the upper ends 20 of the rollers 18 so that the later fit into the downwardly-facing recesses or sockets 14 of the upper retainer 12. With the tapered grooves 34 thus placed in axial alignment with one another (FIGURE 3), the operator slides one of the spacers 22 into each pair of aligned recesses 34 while at the same time causing the lugs or projections 48 to move radially into their respective radial notches 36 (FIGURES 1 and 4). While this is being done, the tapered side surfaces 42 coact with the tapered groove surfaces 35 to effect precise alignment.

Meanwhile, the spacing portions 44 of the spacers 22 move between the partition walls 32 (FIGURES 2 and 4) with their opposite end surfaces 46 snugly engaging the abutment surfaces 33. The operator then subjects each lug or projection 48 to a staking operation which subjects the metal or other material thereof to local displacement with the staking indentation or dimple 52 formed by the staking operation causing the formation of a corresponding protuberance 54 which enters and interlocks with the adjacent indentation 38 in the bottom of the radial notch 36. This action, performed on the outer or exposed faces 56 of each pair of opposite lugs or projections 48 securely locks all the components of the bearing assembly 10 together.

If the bearing rollers 16 are to roll along an annular path, such as the annular bottom surface of an annular groove in a bearing race rather than on a straight cylindrical surface, such as a shaft, then the grooved race must also be included in the assembly operation described above. This is the case, for example, when the inner race (not shown) has a groove of rectangular cross-section with an annular roller path surface at the bottom thereof, as indicated by the dotted circle 24 in FIGURE 1. It is also the case when the outer race (also not shown) has a groove of rectangular cross-section with an annular roller path surface 25 therein (FIGURE 7).

What I claim is:
1. A roller bearing assembly, comprising:
a pair of annular roller retainers disposed coaxial with one another and having outer and inner peripheries and facing surfaces disposed in axially-spaced parallel relationship,
the facing surface of each retainer having therein a set of bearing roller and recesses with side surfaces of generally circular cross-section disposed in circumferentially-spaced relationship with their centers disposed on a circle coaxial with said retainers,
bearing rollers mounted between said retainers with their opposite end portions rotatably mounted in said recesses in mating bearing engagement with said side surfaces,
said retainers having circumferentially-spaced axially-extending aligned grooves in one periphery thereof with radial notches in the outer faces thereof extending radially beyond the outer ends of said grooves,
and spacer tie bars secured in said grooves and having retainer-spacing intermediate abutment portion extending between and abuttingly engaging said retainers and having radially-extending end portions seated in said notches.

2. A roller bearing assembly, according to claim 1, wherein said intermediate abutment portions and said end portions are integral with said space tie bars and extend codirectionally and substantially radially relatively thereto into said notches.

3. A roller bearing assembly, according to claim 1, wherein said notches have indentations therein and wherein said end portions have protuberances interfitting with sad indentations in locking relationship therewith.

4. A roller bearng assembly, according to claim 1, wherein said grooves have inwardly converging opposite side surfaces and wherein said spacer bars have inwardly converging side surfaces disposed in mating engagement with the opposite converging side surfaces of said grooves.

5. A roller bearing assembly, according to claim 1, wherein said grooves are disposed in the outer peripheries of said retainers and wherein said notches extend inwardly therefrom.

6. A roller bearing assembly, according to claim 1, wherein said grooves are disposed in the inner peripheries of said retainers and wherein said notches extend outwardly therefrom.

7. A roller bearing assembly, according to claim 1, wherein said spacer bars have outer surfaces of arcuate cross section disposed substantially flush with the adjacent peripheries of said retainers.

8. A roller bearing assembly, according to claim 1, wherein partition walls separate said bearing roller end recesses circumferentially from one another, said partition walls having said side walls of said recesses thereon and said grooves and notches being formed in said partition walls.

References Cited

UNITED STATES PATENTS

| | | | |
|---|---|---|---|
| 1,609,618 | 12/1926 | Gallagher | 308—217 |
| 2,540,283 | 2/1951 | Parsons | 308—217 |
| 2,569,531 | 10/1951 | Kunzog. | |

FOREIGN PATENTS 1,087,331  10/1954  France.

MARTIN P. SCHWADRON, *Primary Examiner.*

FRANK SUSKO, *Assistant Examiner.*